Fig. 4.

No. 726,837. Patented May 5, 1903.

UNITED STATES PATENT OFFICE.

LEONARD ANDREWS, OF HASTINGS, ENGLAND.

ELECTRICAL DISTRIBUTING SYSTEM.

SPECIFICATION forming part of Letters Patent No. 726,837, dated May 5, 1903.

Application filed May 10, 1902. Serial No. 106,769. (No model.)

*To all whom it may concern:*

Be it known that I, LEONARD ANDREWS, a subject of the King of Great Britain and Ireland, residing at Hastings, in the county of Sussex, England, have invented Improvements in and Relating to Electrical Distributing Systems, of which the following is a specification.

This invention has reference to improvements in electrical distribution systems of the kind wherein duplicate mains or feeders (hereinafter called "feeders") are used in connection with a distributing network of conductors and with a common return-conductor or return-conductors; and it has for object to provide simple, efficient, and reliable means whereby in the event of failure of either feeder from any cause, such as short-circuiting thereof, any serious drop in pressure in the healthy or intact feeder at the end thereof remote from the electrical generator and any interruption in the supply of current shall be prevented and whereby the feeder that has failed can be automatically disconnected from the portion of the distributing system to which the feeders are connected and from the healthy feeder, so that the latter feeder will then alone supply the said portion of the distributing system with current.

The invention consists in various novel features of construction and combinations and arrangements of parts, all as hereinafter described, and specifically pointed out in the claims.

In the accompanying illustrative drawings.

According to the arrangement shown in Fig. 1 the two feeders $ab$ of each pair are at the end remote from the alternating-current generator $c$ each connected in series with one of two coils $d$ and $e$, that are wound upon an iron core $f$ and are connected together at $g$ and to the external portion $h$ of the distributing network of the system, the two coils $d$ and $e$, with their core $f$, forming what is hereinafter called a "discriminating choking device." The arrangement is such that assuming the number of turns in the respective coils $d$ and $e$ on the discriminating choking device to be equal then under normal conditions the current will divide itself equally between the two feeders $a$ and $b$ and flow in opposite directions around the two coils $d$ and $e$, so as to neutralize each other's action on the core $f$, so that the only appreciable drop in pressure will be that due to the ohmic resistance of the circuit and the difference in pressure between each feeder $a$ or $b$ and the return-conductor or return-conductors $i$ will be equal for all variations of the load in the portion $h$ of the distributing-circuit supplied through the said feeders. If, however, the load be transferred from a point beyond the remote end of the feeders $a\ b$ to any point of either of them between the discriminating choking device $d\ e\ f$ and source $c$ of electric supply—say, for example, to the point $k$— caused, for example, by a short circuit on the feeder $a$, the direction of the current through the two coils $d$ and $e$ of the discriminating choking device will then be such as to tend to magnetize the core $f$ of the discriminating choking device in the same direction, and as a consequence there will be a considerable drop of pressure across it, depending upon the amount of the new load. If this load be caused by the said feeder $a$ and return-conductor $i$, Fig. 1, being short-circuited one on the other, the drop across the discriminating choking device will be practically equivalent to the electromotive force of the source of supply and the pressure across the said feeder and return-conductor will fall to zero, while that between the other feeder $b$ and the return-conductor or corresponding return-conductor will remain normal, due to the action of the discriminating choking device, which then acts as a choking-coil. In this way the discriminating choking device prevents an excessive current passing to the damaged or inoperative feeder. Each feeder $a$ and $b$ may be connected to the electric generator $c$ by a fuse $n$, as usual; also each feeder $a$ and $b$ may be provided at a point near to the discriminating choking device $d\ e\ f$ and on the side thereof next the electric generator $c$ with a cut-out device (hereinafter called a "switch") comprising, for example, a bent switch-lever having two arms $o\ o'$, whereof $o$ is the operating-arm and $o'$ the contact-arm, which normally connects one of the feeders $a$ or $b$ to the corresponding coil $d$ or $e$.

Figure 1:
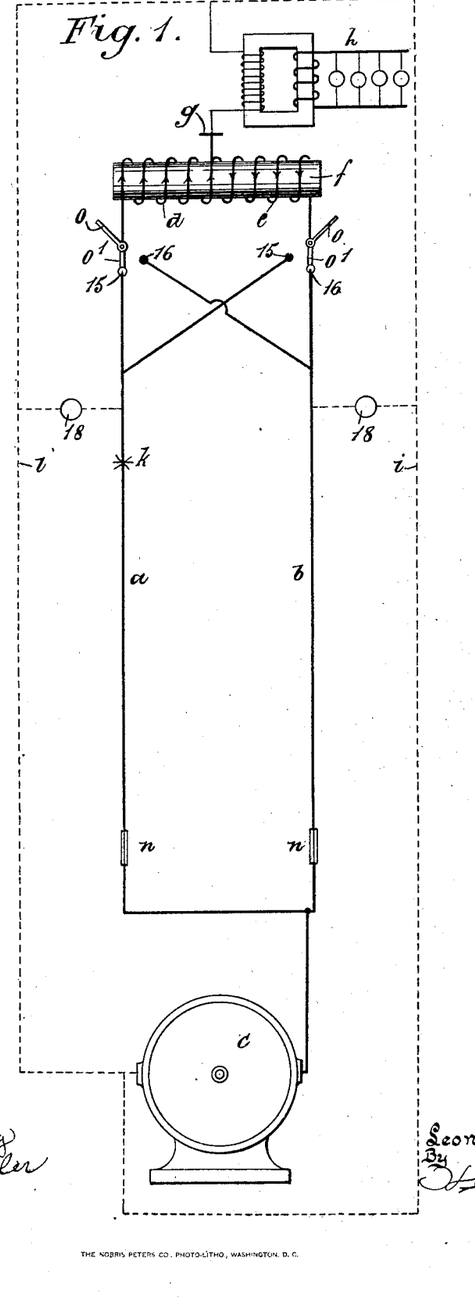
Figure 1 is a diagram showing part of an electrical single-phase distributing system embodying the present invention.
Figures 2, 3:
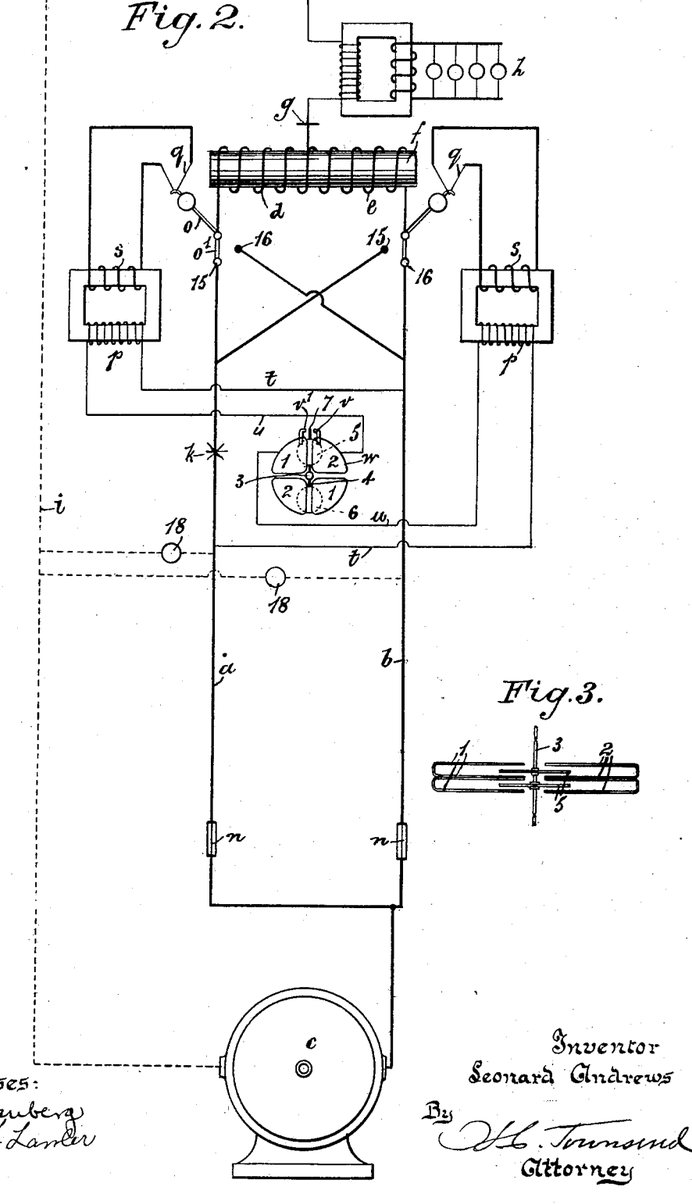
Fig. 2 is a similar view to Fig. 1, but showing means for automatically operating certain cut-out devices.
Fig. 3 is a plan of a static relay shown in Fig. 2.
Figure 4:
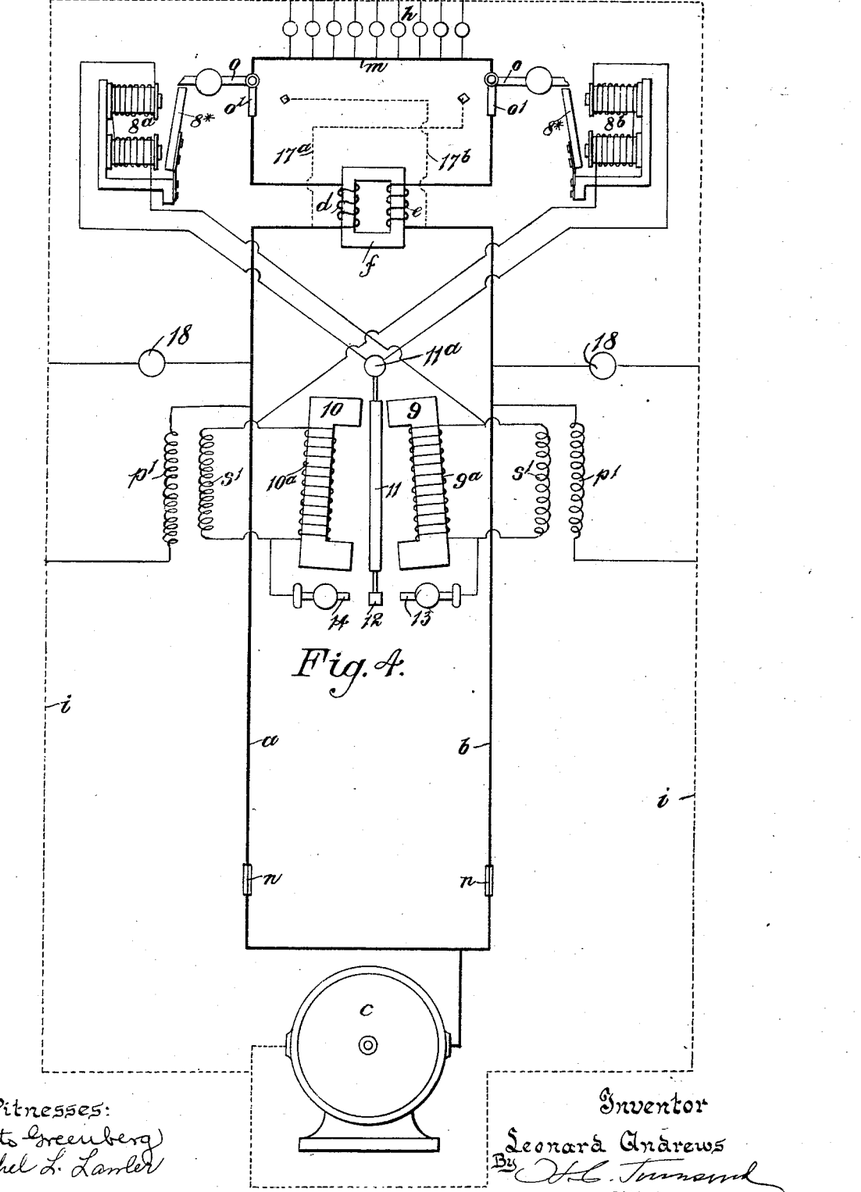
Fig. 4 is a similar view to Fig. 2, but showing modified means for automatically operating the cut-out devices.

The two coils $d$ and $e$ of the discriminating choking device may, as shown in Figs. 1 and 2, be formed by the two halves of a single coil the two ends of which are respectively connected to the two feeders $a$ and $b$, so as to be in series therewith, and the central portion of which is connected to the portion or portions $h$ of the distributing network supplied through the said feeders, so that normally the current supplied from the feeders flows in opposite directions through the two halves of the coil to the center thereof, or the two coils $d$ and $e$ may, as shown in Fig. 4, be arranged side by side and be connected together through a bus-bar $m$, to which the portions $h$ of the distributing system supplied through the said feeders are connected. The core $f$, upon which the coil is wound, may be straight, as shown in Figs. 1 and 2, or of other convenient shape. It is, however, preferably closed on itself and may in this case be in the form of a rectangular frame, as shown in Fig. 4.

To cause each feeder $a$ and $b$ when damaged to be automatically disconnected from the other feeder and the portion or portions $h$ of the distributing network which they normally supply with current, so that such distributing network shall be supplied with current through the healthy feeder alone, the switch-lever $o\ o'$ of each feeder is adapted to be normally held in the closed position and is controlled by electrical means which on the failure of the corresponding feeder automatically acts to cause the switch to open the circuit of the said feeder. The arrangement shown for this purpose in Fig. 2 comprises a transformer the secondary winding $s$ of which has its circuit completed through a fusible device—as, for example, a length of wire $q$—that normally holds the switch-arm $o$ which is loaded in a position in which the switch-arm $o'$ closes the connection between the feeder and the corresponding coil $d$ or $e$, the primary winding $p$ of the said transformer being arranged in series with two conductors $t$ and $u$, one of which—viz., $t$—is connected to the opposite feeder $a$ or $b$ to that to which the said switch $o\ o'$ belongs and the other of which—viz., $u$—is connected to a contact point, pin, or plate $v$ or $v'$, that is normally insulated, so that the circuit of the primary winding $p$ is normally open, but is adapted to be closed by a circuit-controlling device $w$ (hereinafter called a "relay") in the event of failure of the feeder controlled by the said switch. It will thus be understood that the switch $o\ o'$, controlling each feeder $a$ or $b$, is controlled by a transformer adapted to be energized by current from the other feeder $b$ or $a$. The working of this arrangement is as follows: When the two feeders $a$ and $b$ are intact and their actions on the discriminating choking device $d\ ef$ balance each other, the transformers $p\ s$ will be on open circuit and the switches $o$ will be held closed; but in the event of failure of either feeder—for example, $a$—the balance between the two feeders will be disturbed as hereinbefore described and the relay $w$ will be operated in a direction to complete the circuit of the primary winding $p$ of the transformer $p\ s$, controlling the switch $o\ o'$ of the damaged feeder, so that such primary winding will be energized by current from the healthy feeder—say $b$—and will set up a current in the secondary winding $s$ of the said transformer of sufficient strength to melt the fusible device $q$, that held the loaded switch $o\ o'$ of the damaged feeder in the closed position, and allow this switch-lever to move under the action of gravity or a spring into a position to disconnect the damaged feeder from the discriminating choking device. The relay may, as shown in Figs. 2 and 3, conveniently be an electrostatic one and comprise a set of fixed plates 1, connected to the feeder $a$, and a set of fixed plates 2, connected to the feeder $b$, so that each set of plates 1 and 2 will be statically charged from the feeder to which it is connected, and a spindle 3, that is provided with lever-arms 4, carrying two sets of movable plates 5 and 6, arranged in proximity to the statically-charged plates 1 and 2, the arrangement resembling a quadrant electrometer. Connected to one of the arms 4 is a contact-arm 7, that is connected to earth through the said arm and spindle and is arranged between the two insulated points $v\ v'$, connected to the primary windings $p$ of the two transformers, for which purpose they may be connected to the two sets of plates 1 and 2, respectively, as shown. The arrangement is such that normally the action of the two sets of statically-charged plates 1 and 2, connected to the feeders $a$ and $b$, respectively, on the two sets of plates 5 and 6, carried by the lever-arms 4, will balance each other and hold the contact-arm 7 in the open or inoperative position; but in the event of the balance between the two feeders being disturbed by the failure of one of the feeders, as hereinbefore described, the action of the statically-charged set of plates 1 or 2, connected to the healthy feeder, will be unbalanced, and such plates will actuate the movable sets of plates 5 and 6 and lever-arms 4 and cause the contact-arm 7 carried thereby to come in contact with one or other of the fixed contact-points $v$ or $v'$ and complete the circuit of the primary winding $p$ of the transformer controlling the switch $o\ o'$ belonging to the damaged feeder and cause this switch to disconnect such feeder from the other feeder and the distributing network $h$. Each primary winding $p$ is so constructed as to permit only of a small current—say half an ampere—to pass through the relay when the circuit is completed. As the electrical pressure or potential across the points of contact 7 and $v$ or $v'$ will be very high, the action of the relay will be unaffected by oxidation of the contact-surfaces.

In the modified arrangement shown in Fig. 4 the loaded arm $o$ of each switch $o$ $o'$ is held up by the armature 8 of one of two electromagnets $8^a$ and $8^b$ that are controlled by a relay comprising two oppositely-arranged electromagnets 9 $9^a$ and 10 $10^a$, each having its winding $9^a$ or $10^a$ in series with the secondary winding $s'$ of a small transformer the primary winding $p'$ of which is of higher resistance and arranged as a shunt between feeder $b$ or $a$ and the return-conductor $i$ or one of the return-conductors $i$ when there are two, as shown. The arrangement is such that the two electromagnets 9 $9^a$ and 10 $10^a$ are separately energized from the two feeders $b$ and $a$, respectively, and exactly balance each other under normal conditions of working, but will be unbalanced should either feeder become accidentally short-circuited or its fuse $n$ become blown. Mounted to oscillate between the two electromagnets is an armature 11, the pivoted end of which is connected to end one of the winding of each of the two electromagnets $8^a$ $8^b$ and the free end of which carries a contact 12, arranged to move between two fixed but adjustable contacts 13 and 14, one of which—viz., 13—is connected to one end of the secondary winding $s'$ of the transformer $s'$ $p'$, arranged to be energized from the feeder $b$, and the other—viz., 14—is connected to one end of the secondary winding $s'$ of the opposite transformer, arranged to be energized from the feeder $a$. The other ends of the two secondary windings $s'$ $s'$ are respectively connected to the second end of the windings of the two electromagnets $8^a$ $8^b$ in such a way, as shown, that the second end of the winding of each electromagnet $8^a$ or $8^b$ will be connected to the secondary winding $s'$ of the transformer $s'$ $p'$ that is energized from the feeder controlled by the opposite electromagnet. The arrangement is such that when the armature 11 is in its mid and inoperative position the circuit of each electromagnet $8^a$ $8^b$ will be open; but upon the balance of the relay-electromagnets 9 $9^a$ and 10 $10^a$ being destroyed the relay-armature 11 will move to one side of its mid-position and close the circuit of the electromagnet $8^a$ or $8^b$, controlling the switch-lever $o$ $o'$ of the damaged feeder through the secondary winding $s'$ of the transformer energized by the healthy feeder, the said electromagnet and switch then acting to open the circuit of the damaged feeder. To enable the healthy feeder to supply current to the distributing system $h$ through the two coils $d$ $e$ of the discriminating choking device in the same way that the two healthy feeders did so, the movable contact-arm $o'$ of each switch-lever $o$ $o'$ is connected to one end of the corresponding coil $d$ or $e$, Figs. 1 and 2, and is arranged to work between two fixed contacts 15 and 16, one of which—viz., 15—is connected to the feeder $a$ and the other—viz., 16—to the second feeder $b$. The arrangement is such that normally each switch contact-arm $o'$ connects the coil $d$ or $e$ of the discriminating choking device to the corresponding feeder $a$ or $b$; but when the loaded switch-arm $o$ is released, as hereinbefore described, it moves the contact-arm $o'$ into a position in which it becomes disconnected from its own feeder and comes into connection with the fixed contact connected to the other feeder, which then becomes connected to the feeding ends of the two coils $d$ $e$. By this means the resistance of the feeding portion of the circuit is maintained nearly constant, whether one or both of the feeders $a$ and $b$, which are of low resistance, is or are in use.

In some cases each switch may be arranged to short-circuit the discriminating choking device when the circuit of either feeder is opened, and thus enable the healthy feeder to supply the distributing system $h$ direct. In this case each feeder $a$ and $b$ has connected to it near to the discriminating choking device $d$ $e$ $f$ and on the supply side thereof, as shown in Fig. 4, one end of a conductor $17^a$ or $17^b$, respectively, the other end of which is normally disconnected from the common conductor or bus-bar $m$ to which the two feeders $a$ and $b$ are normally connected by the switches $o$ $o'$ of the cut-out devices, but which is adapted to be automatically connected to such common conductor or bus-bar by the contact-arm $o'$ of the cut-out device $8^a$ or $8^b$, controlling the opposite feeder, when such cut-out device is brought into operation, as hereinbefore described.

In some cases the switches $o$ $o'$ may be arranged to be operated by hand instead of automatically. Fig. 1 shows such an arrangement. A voltmeter 18 may be connected across each feeder $a$ and $b$ and the return-conductor $i$ or corresponding return-conductor, and the behavior of these voltmeters will indicate to an attendant in charge at the distributing end which feeder has become short-circuited, and he will in consequence be able to switch out the faulty feeder and leave the supply maintained through the remaining healthy feeder. Such voltmeters may advantageously be employed when the switches are adapted to be operated automatically.

Figure 5:
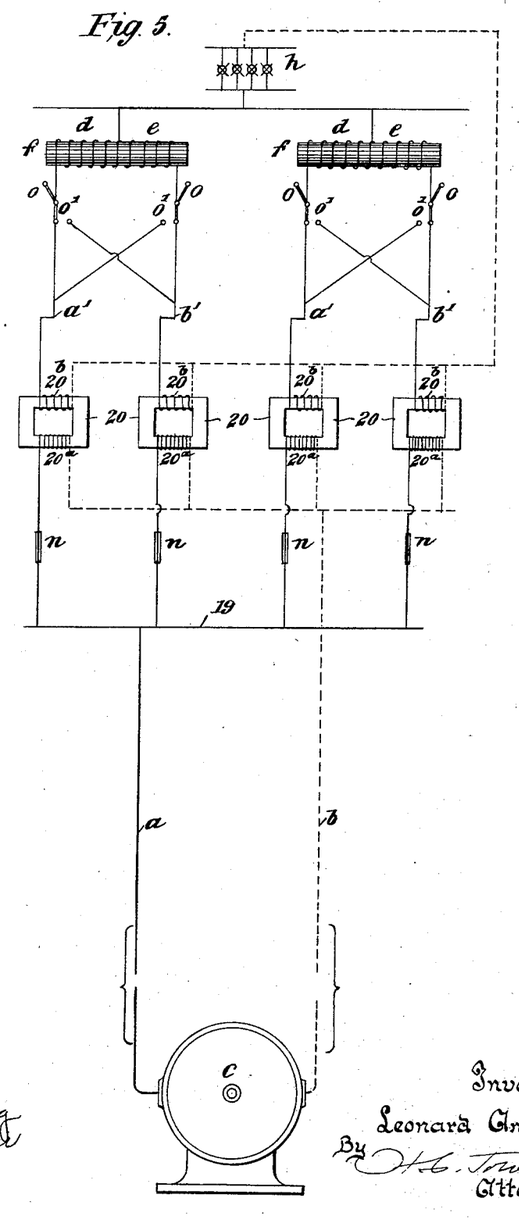
Fig. 5 is a diagram showing a further modified arrangement.

The feeders $a$ and $b$ may be supplied with alternating current either direct from an alternating-current generator, as in Figs. 1, 2, and 4, or indirectly therefrom through transformers. Fig. 5 shows an arrangement of the latter kind, wherein a bus-bar 19 is supplied with alternate current from an alternate-current generator $c$ through a conductor $a$, and the distributing network $h$ is supplied through one or more pairs of additional feeders $a'$ $b'$ from one or more pairs of transformers 20, (two pairs are shown,) the primary windings $20^a$ of which are energized from the bus-bar 19 and have fuses $n'$ in circuit therewith, and the secondary windings $20^b$ of which are connected to the additional feeders, each pair $a'\,b'$ of which is connected to the distributing network $h$ through a discriminating choking device $d\,e\,f$ and switches $o\,o'$, arranged and operating like those for the pair of main feeders.

Figure 6:
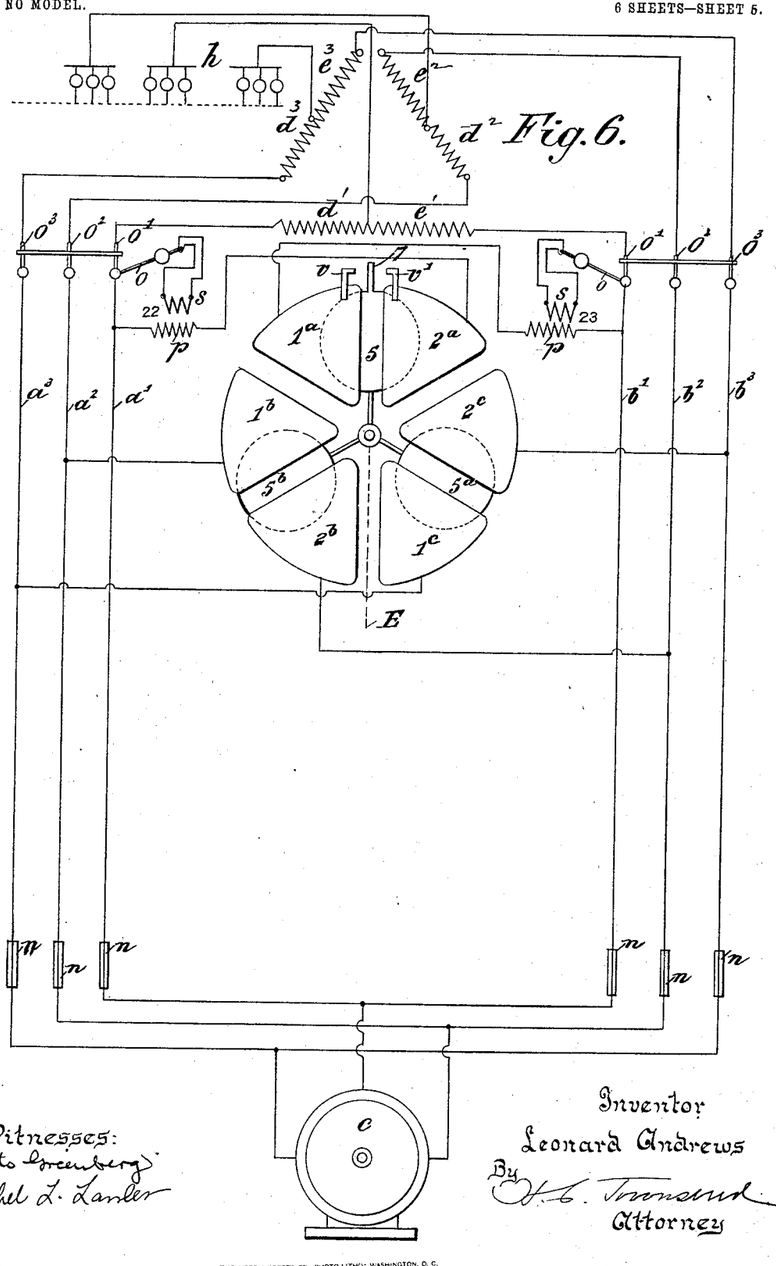
Figs. 6 and 7 are diagrams showing the invention applied in connection with a three-phase distributing system.
Figure 7:
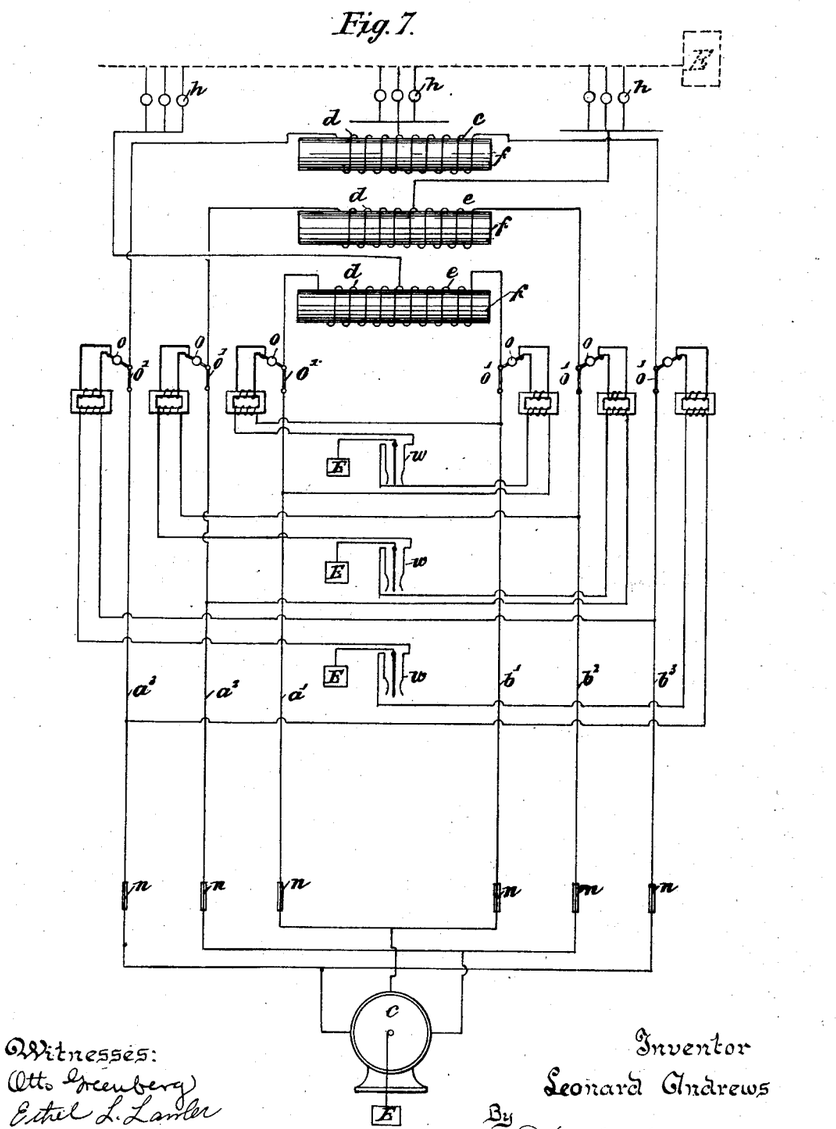

The invention can also be applied in connection with electrical distributing systems using polyphase electric currents. Thus for a three-phase distributing system a three-phase one-to-one transformer or discriminating choking device having coils $d'\,e'$, $d^2\,e^2$, and $d^3\,e^3$, connected to the duplicate pairs of sets of feeders $a'\,a^2\,a^3$ and $b'\,b^2\,b^3$, may be used, as shown in Fig. 6, with an electrostatic relay having fixed plates $1^a$, $1^b$, and $1^c$, connected to the feeders $a'\,a^2\,a^3$, respectively, and fixed plates $2^a\,2^b\,2^c$, connected to the feeders $b'\,b^2\,b^3$, respectively, and three movable plates $5^a$, $5^b$, and $5^c$, normally arranged as shown and holding the movable contact 7 between the fixed contacts $v\,v'$. The set of feeders $a'$, $a^2$, and $a^3$ is normally connected to the coils $d'$, $d^2$, and $d^3$ by a three-pole switch $o'\,o^2\,o^3$, controlled by a small transformer 22 in the manner hereinbefore described by current from one of the feeders $b'\,b^2\,b^3$—for example, $b'$—as shown. The set of feeders $b'\,b^2\,b^3$ is normally connected to the coils $e'\,e^2\,e^3$ by another and similar three-pole switch $o'\,o^2\,o^3$, controlled by a second small transformer 23, energized by current from one of the feeders—say $a'$—in the other set of feeders $a'\,a^2\,a^3$, or instead of the arrangement shown in Fig. 6 three distinct one-to-one transformers or discriminating choking devices like those shown in Figs. 1, 2, 4, and 5, with separate switches controlled by three relays like those shown in Figs. 2 and 3, may be used, as shown in Fig. 7.

What I claim is—

1. An electric supply system comprising an alternating-current generator, a conductor to be supplied with current from said generator, a discriminating choking device, and duplicate feeders including respectively separate coils of said discriminating choking device.

2. An alternating-current distributing system comprising an electric generator, a conductor to be supplied with current from said generator, feeders connected to said electric generator, and coils connected together and to said feeders and conductor neutralizing each other's action when current flows simultaneously in the same direction through said feeders, but acting as a choking-coil when current flows in opposite directions through said feeders.

3. An alternating-current distributing system comprising an electric generator, a conductor to be supplied therefrom, feeders connected to said electric generator, and discriminating choking device comprising coils connected together and to said feeders and conductor and a magnetic core for said coils, said core magnetized by said coils in opposite directions when said feeders are intact and traversed by current passing from said electric generator to said conductor but to jointly magnetize said core in the same direction when one of said feeders fails.

4. An alternating current-distributing system, comprising an electric generator, a pair of feeders connected thereto, a pair of coils connected together and each in series with one of said feeders, a core magnetized by said coils, and a conductor connected to said feeders through said coils.

5. An electrical distributing system comprising an alternating-current generator, a conductor to be supplied with current therefrom, duplicate feeders connecting said generator and conductor, coils each arranged in series with one of said feeders, and a core normally magnetized in opposite directions by said coils when said feeders are intact but magnetized in the same direction when either feeder fails.

6. An electrical distributing system comprising an alternating-current generator, duplicate feeders connected at one end to said generator, a coil connecting the other ends of said feeder, an iron core extending through said coil, and a distributing-conductor connected to the central portion of said coil.

7. An electrical distributing system comprising an alternating-current generator, a conductor to be supplied with current therefrom, feeders connected to said generator, a discriminating choking device through which said feeders are connected to said conductor and retarding the passage of current from one feeder to the other, and cut-out devices which separately control each feeder.

8. An electrical distributing system comprising an alternating-current generator, a conductor to be supplied with current therefrom, feeders connected to said generator, a discriminating choking device through which said feeders are connected to said conductor and which is adapted to retard the passage of current from one feeder to the other, an automatic cut-out device connected to each feeder at the generator end thereof, and a cut-out device controlling each feeder at the end thereof remote from said generator.

9. An electrical distributing system comprising an alternating-current generator, a conductor to be supplied with current therefrom, feeders connected to said generator, a discriminating choking device through which said feeders are connected to said conductor and which is adapted to retard the passage of current from one feeder to the other, a return-conductor between the first-mentioned conductor and said generator, cut-out devices for opening and closing the circuit of said feeders at points near to said discriminating choking device, and a voltmeter connected across each feeder and return-conductor.

10. An electrical distributing system comprising an alternating-current generator, a conductor to be supplied with current therefrom, feeders connected to said generator, a discriminating choking device through which said feeders are connected to said conductor and which is adapted to retard the passage of current from one feeder to the other, and means for automatically disconnecting either feeder, on failure thereof, from the other feeder and conductor.

11. An electrical distributing system comprising an alternating-current generator, a conductor to be supplied with current therefrom, feeders connected to said generator, a discriminating choking device through which said feeders are connected to said conductor and which is adapted to retard the passage of current from one feeder to the other, a switch for opening the circuit of each feeder on failure thereof, and means adapted on failure of either feeder, to automatically open the switch controlling the circuit of such feeder.

12. An electrical distributing system comprising an alternating-current generator, a conductor to be supplied with current therefrom, feeders connected to said generator, a discriminating choking device through which said feeders are connected to said conductor and which is adapted to retard the passage of current from one feeder to the other, a switch for opening the circuit of each feeder on failure thereof, and electrical means adapted on failure of either feeder, to automatically open the switch controlling the circuit of such feeder.

13. An electrical distributing system comprising an alternating-current generator, a conductor to be supplied with current therefrom, feeders connected to said generator, a discriminating choking device through which said feeders are connected to said conductor and which is adapted to retard the passage of current from one feeder to the other, switches adapted to open and close the circuits of said feeders at the ends thereof remote from said electric generator, and electric controlling devices each adapted to be energized from one feeder and to cause the opening of the switch of the other feeder in the event of failure of the latter feeder.

14. An electrical distributing system comprising an alternating-current generator, a conductor to be supplied with current therefrom, feeders connected to said generator, a discriminating choking device through which said feeders are connected to said conductor and which is adapted to retard the passage of current from one feeder to the other, switches each adapted to open and close the circuit of one of said feeders at a point near to said discriminating choking device, electrical devices arranged to control said switches and each adapted, when energized, to cause the corresponding switch to open and automatically disconnect its feeder from said discriminating choking device, and a relay that is inoperative on said electrical controlling devices when said feeders are intact but will, in the event of failure of either feeder, automatically come into action to energize the controlling device of the corresponding switch and cause such switch to move into its open position.

15. An electrical distributing system comprising an alternating-current generator, a conductor to be supplied with current therefrom, feeders connected to said generator, a discriminating choking device through which said feeders are connected to said conductor and which is adapted to retard the passage of current from one feeder to the other, switches each adapted to open and close the circuit of one of said feeders at a point near to said discriminating choking device, electrical devices arranged to control said switches and each comprising an electrical transformer the secondary winding of which includes fusible material adapted to normally hold the corresponding switch in the closed position against a force tending to automatically move it into the open position, and the primary winding of which is adapted to be placed in connection with a source of current, and a relay that is normally inoperative but is adapted, in the event of failure of either feeder, to automatically complete the circuit of the primary winding of the transformer controlling the circuit of such feeder.

16. An electrical distributing system comprising an alternating-current generator, a conductor to be supplied with current therefrom, feeders connected to said generator, a discriminating choking device through which said feeders are connected to said conductor and which is adapted to retard the passage of current from one feeder to the other, switches each adapted to open and close the circuit of one of said feeders at a point near to said discriminating choking device, electrical devices arranged to control said switches and each comprising an electrical transformer the secondary winding of which includes fusible material adapted to normally hold the corresponding switch in the closed position against a force tending to automatically move it into the open position, and the primary winding of which is connected at one end to the feeder controlled by the opposite switch and at the other end to an insulated contact, and a relay that is normally inoperative but is adapted, in the event of failure of either feeder, to automatically complete the circuit of the primary winding of the transformer controlling the circuit of the damaged feeder through the healthy feeder.

17. An electrical distributing system comprising an alternating-current generator, a conductor to be supplied with current therefrom, feeders connected to said generator, a discriminating choking device through which said feeders are connected to said conductor and which is adapted to retard the passage of current from one feeder to the other, switches each adapted to open and close the circuit of one of said feeders at a point near to said discriminating choking device, electrical devices arranged to control said switches and each adapted, when energized, to cause the corresponding switch to open and automatically disconnect said feeder from said discriminating choking device, and an electrostatic relay that is arranged to be statically charged from said feeders and is normally inoperative but is adapted, in the event of failure of either feeder, to come into action and cause the controlling device of the corresponding switch to become energized and cause such switch to move into the open position.

18. An electrical distributing system comprising an alternating-current generator, a conductor to be supplied with current therefrom, feeders connected to said generator, a discriminating choking device through which said feeders are connected to said conductor and which is adapted to retard the passage of current from one feeder to the other, switches each adapted to open and close the circuit of one of said feeders at a point near to said discriminating choking device, electrical devices arranged to control said switches and each comprising an electrical transformer the secondary winding of which includes fusible material adapted to normally hold the corresponding switch in the closed position against a force tending to automatically move it into the open position, and the primary winding of which is adapted to be placed in connection with a source of current, an electrostatic relay that is statically charged from said feeders and is normally inoperative but is adapted in the event of failure of either feeder, to automatically complete the circuit of the primary winding of the transformer controlling the circuit of such feeder.

19. An electrical distributing system comprising an alternating-current generator, a conductor to be supplied with current therefrom, feeders connected to said generator, a discriminating choking device through which said feeders are connected to said conductor and which is adapted to retard the passage of current from one feeder to the other, switches each adapted to open and close the circuit of one of said feeders at a point near to said discriminating choking device, and electrical devices arranged to control said switches, each switch when moved into position to open the circuit of its feeder being adapted to connect the opposite feeder to said conductor.

20. An electrical distributing system comprising an alternating-current generator, a conductor to be supplied with current therefrom, feeders connected to said generator, a discriminating choking device through which said feeders are connected to said conductor and which is adapted to retard the passage of current from one feeder to the other, switches each adapted to open and close the circuit of one of said feeders at a point near to said discriminating choking device, and electrical devices arranged to control said switches, each switch when moved into the position to open the circuit of its feeder being adapted to connect the opposite feeder to said conductor through said discriminating choking device.

21. An electrical distributing system comprising an alternating-current generator, a conductor to be supplied with current therefrom, feeders connected to said generator, a discriminating choking device comprising coils connected together and to said feeders and conductor and a magnetic core for said coils, and switches arranged near to said discriminating choking device and controlling the circuits of said feeders, each switch being adapted when moved to disconnect its feeder from one end of the corresponding coil, to connect the other feeder to the said end of the coil.

22. An electrical distributing system comprising an alternating-current generator, duplicate feeders connected thereto, a distributing-conductor, coils connected together and to said conductor and provided with an iron core, and switches each adapted when moved into one position, to connect one of said coils to one of said feeders, and when moved into another position to disconnect said coil from the one feeder and connect it to the other feeder.

23. An electrical distributing system comprising an alternating-current generator, duplicate feeders connected thereto through fuses, a coil provided with an iron core, a distributing-conductor connected to the central portion of said coil, and two switches each adapted to connect one end of said coil to either of said feeders at the end thereof remote from said generator.

24. An electrical distributing system comprising an alternating-current generator, duplicate feeders connected thereto, a conductor to be supplied from said generator, coils connected together and at a point between them to said conductor, switches each comprising a loaded switch-lever having a contact-arm connected to one end of each coil and adapted to be normally in connection with one of said feeders and when released to automatically move under the action of its load into a position to disconnect such coil from said feeder and connect it to the opposite feeder, and electrical controlling devices for said switches, each controlling device being adapted to normally hold the corresponding switch in the one position against the action of the load tending to move it into a second position, and to release said switch and allow it to move into the second position, in the event of failure of the corresponding feeder.

25. An electrical distributing system comprising an alternate-current generator, a conductor to be supplied therefrom, a pair of coils connected together and to said conductor at a point between them, an iron core for said pair of coils, a pair of switches, a pair of transformers having their primary windings connected to the conductor, and a pair of feeders connected to the secondary windings of said transformers and each connected to said conductor through one of said switches and coils.

26. An electrical distributing system, comprising a polyphase alternating-current generator, main distributing-conductors corresponding in number to the phases of the current supplied, pairs of coils with iron cores, the two coils of each pair being connected together and, at a point between them, to one of said conductors, pairs of feeders connected to said generator, and corresponding in number to the number of current phases, each pair of feeders being connected to one of said conductors through the corresponding pair of coils as and for the purpose set forth, and switches for disconnecting each feeder from the corresponding coil in the event of failure of such feeder, substantially as described.

Signed at 77 Cornhill, in the city of London, England, this 24th day of April, 1902.

LEONARD ANDREWS.

Witnesses:
  WM. O. BROWN,
  F. C. SMITH.